United States Patent
Wortmann et al.

(10) Patent No.: US 9,951,756 B2
(45) Date of Patent: Apr. 24, 2018

(54) PIPELINE SYSTEM FOR A SOLAR POWER PLANT

(71) Applicant: BASF SE, Ludwigshafen (DE)

(72) Inventors: Jürgen Wortmann, Limburgerhof (DE); Michael Lutz, Speyer (DE); Katharina Federsel, Heidelberg (DE); Kerstin Schierle-Arndt, Zwingenberg (DE); Stephan Maurer, Neustadt (DE); Michael Ladenberger, Annweiler am Trifels (DE)

(73) Assignee: BASF SE, Ludwigshafen (DE)

( * ) Notice: Subject to any disclaimer, the term of this patent is extended or adjusted under 35 U.S.C. 154(b) by 86 days.

(21) Appl. No.: 15/113,125

(22) PCT Filed: Jan. 23, 2015

(86) PCT No.: PCT/EP2015/051387
§ 371 (c)(1),
(2) Date: Jul. 21, 2016

(87) PCT Pub. No.: WO2015/110594
PCT Pub. Date: Jul. 30, 2015

(65) Prior Publication Data
US 2017/0009749 A1    Jan. 12, 2017

(30) Foreign Application Priority Data

Jan. 24, 2014   (EP) ..................................... 14152453

(51) Int. Cl.
*F03G 6/00*      (2006.01)
*F24J 2/34*      (2006.01)
(Continued)

(52) U.S. Cl.
CPC ............... *F03G 6/005* (2013.01); *F03G 6/06* (2013.01); *F24J 2/07* (2013.01); *F24J 2/30* (2013.01);
(Continued)

(58) Field of Classification Search
CPC ...... F03G 6/005; F03G 6/06; F24J 2/34; F24J 2/30; F24J 2/07; F24J 2/4607; F24J 2/42; Y02E 10/46; Y02E 10/41
(Continued)

(56) References Cited

U.S. PATENT DOCUMENTS 3,931,806 A * 1/1976 Hayes ................... F24D 11/007
                                                        126/587
4,044,949 A    8/1977 Morawetz et al.
(Continued)

FOREIGN PATENT DOCUMENTS

CA    2 798 229 A1    11/2011
DE    44 24 176 A1    1/1996
(Continued)

OTHER PUBLICATIONS

International Search Report for PCT/EP2015/051387 dated May 7, 2015.
(Continued)

*Primary Examiner* — Hoang Nguyen
(74) *Attorney, Agent, or Firm* — Drinker Biddle & Reath LLP

(57) ABSTRACT

The invention relates to a pipeline system for a linearly concentrating solar power plant (1) with at least one receiver line (13), in which a heat transfer medium is heated by radiating solar energy, or with a central receiver and at least one emptying tank (21) and/or one store for the heat transfer medium, the heat transfer medium having a vapor pressure of less than 0.5 bar at the maximum operating temperature.

(Continued)

Figure 1:
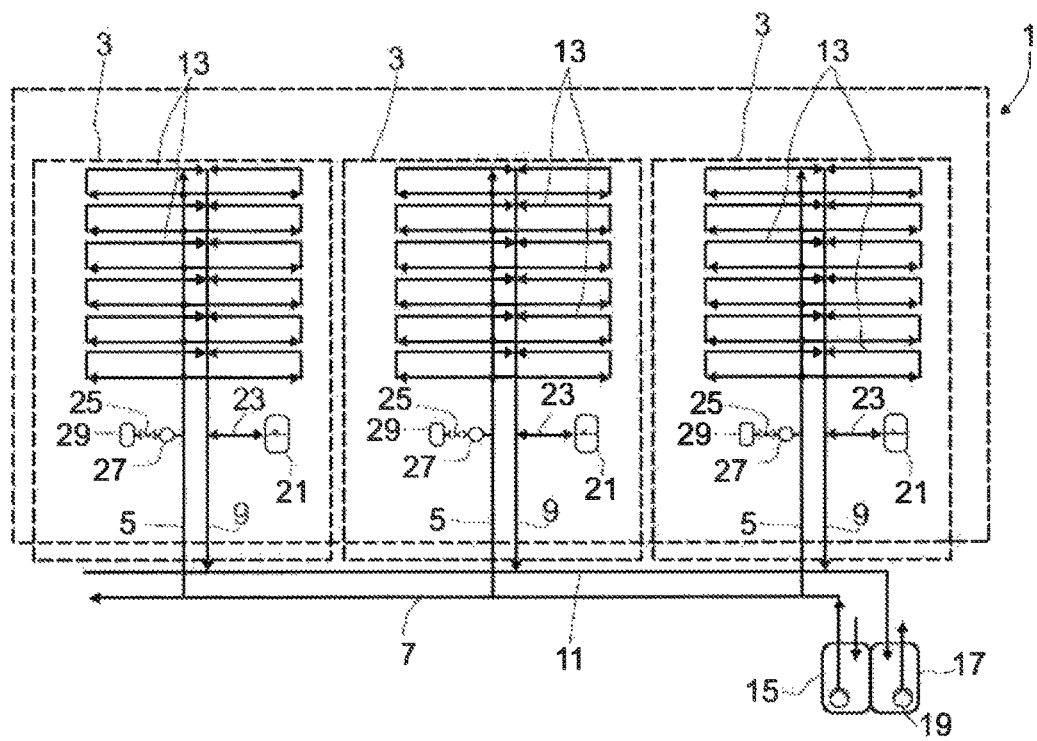

Furthermore, a gas displacement system (31) is comprised, which connects gas spaces in the at least one emptying tank (21) and/or in the store for the heat transfer medium to one another and which has a central gas store (35) and/or a central gas connection (37) and a central exhaust gas outlet (39), through which gas can be discharged into the surroundings.

20 Claims, 4 Drawing Sheets

(51) Int. Cl.
F03G 6/06 (2006.01)
F24J 2/07 (2006.01)
F24J 2/42 (2006.01)
F24J 2/46 (2006.01)
F24J 2/30 (2006.01)

(52) U.S. Cl.
CPC . *F24J 2/34* (2013.01); *F24J 2/42* (2013.01); *F24J 2/4607* (2013.01); *Y02E 10/41* (2013.01); *Y02E 10/46* (2013.01)

(58) Field of Classification Search
USPC .................. 60/641.8–641.15, 659, 646, 657
See application file for complete search history.

(56) References Cited

U.S. PATENT DOCUMENTS

| | | |
|---|---|---|
| 4,366,853 A | 1/1983 | Bernier |
| 4,403,602 A * | 9/1983 | Warden ................. F24D 3/1066 126/610 |
| 4,458,669 A * | 7/1984 | Lee ....................... F24D 11/003 126/570 |
| 2008/0066736 A1* | 3/2008 | Zhu ......................... F03G 6/005 126/620 |
| 2010/0199974 A1* | 8/2010 | Plotkin ...................... F24J 2/07 126/617 |
| 2013/0056081 A1 | 3/2013 | Wortmann et al. |
| 2014/0174080 A1* | 6/2014 | Friesth ...................... F01K 3/00 60/641.1 |

FOREIGN PATENT DOCUMENTS

| | | |
|---|---|---|
| WO | WO-2009/101586 A2 | 8/2009 |
| WO | WO-2010/149177 A2 | 12/2010 |
| WO | WO-2011/138270 A1 | 11/2011 |
| WO | WO-2012/006257 A2 | 1/2012 |
| WO | WO-2013/034587 A1 | 3/2013 |

OTHER PUBLICATIONS

International Preliminary Examination Report with Annexes for PCT/EP2015/051387 dated Apr. 11, 2016.

* cited by examiner

PIPELINE SYSTEM FOR A SOLAR POWER PLANT

RELATED APPLICATIONS

This application is a national stage application (under 35 U.S.C. § 371) of PCT/EP2015/051387, filed Jan. 23, 2015, which claims benefit of European Application No. 14152453.8, filed Jan. 24, 2014.

The invention proceeds from a pipeline system for a solar power plant with at least one receiver line, in which a heat transfer medium is heated by radiating solar energy, having at least one emptying tank and/or one store for the heat transfer medium, the heat transfer medium having a vapor pressure of less than 0.5 bar at the maximum operating temperature.

Solar power plants are, for example, linearly concentrating solar power plants, such as Fresnel solar power plants or parabolic trough solar power plants, and tower power plants. In these, for example, a molten salt is used as the heat transfer medium which has a vapor pressure of less than 0.5 bar at the maximum operating temperature.

In linearly concentrating solar power plants, the overall pipeline system is generally configured in the form of networks which serve for the capture of solar energy. For this purpose, the radiant energy of the sun is concentrated onto receivers by means of parabolic mirrors or Fresnel mirrors. The combination of mirror and receiver is usually called a collector. A series of collectors is connected in series to form what are known as solar loops. For this purpose, the receivers are connected in each case to the pipeline system or constitute part of the pipeline system. The heat transfer medium liquid, to which the radiant energy captured by the receivers is transmitted, flows through the pipeline system.

Heat transfer media which have a vapor pressure of less than 0.5 bar at the maximum operating temperature are, for example, molten salts, for example what is known as solar salt, a mixture of sodium nitrate and potassium nitrate in a ratio of 60:40. This is used particularly in order to achieve higher operating temperatures and therefore higher efficiency in the solar power plant.

Use of mirrors for the concentration of solar energy is described, for example, in WO 2009/101586 A2 or WO 2012/006257 A2. In both methods, however, the solar energy is used in order to evaporate water in a pipeline. The disadvantage of this system is that vapor cannot be stored directly in large quantities, as is required in linearly concentrating solar power plants. If heat transfer medium liquids possessing a low vapor pressure, for example of less than 0.5 bar, are employed, heat storage is comparatively simple. A large container or tank is filled with the heated heat transfer medium liquid. The heat can be obtained and utilized, as required, from this container by emptying the container.

The use of a mirror for the capture of solar energy, for example in order to melt sand, metal or salt, is known from WO 2010/149177 A2.

In order to obtain the desired high temperatures in a solar power plant, the heat transfer media used are liquids which have a vapor pressure of less than 0.5 bar at the maximum operating temperature, for example molten salts. The heat stores employed are usually very large tanks filled with the melt. In this case, for example, it is possible to provide a combination of a tank with a temperature near the minimum operating temperature and of a tank with a temperature at the maximum operating temperature. When irradiating solar energy, the heat transfer medium is heated up and is transferred from the tank with the lower temperature into the tank with the high temperature. In order to utilize the heat, the heat of the heat transfer medium is transferred out of the tank with a high temperature to a second circuit for the evaporation of water, and the cooled heat transfer medium is recirculated into the tank with a lower temperature. Alternatively to the use of a tank with a high temperature and of a tank with a low temperature, it is also possible to employ a stratified store which may also be designated as a thermoclinic tank.

It is known that solar power plants have arranged in them storage systems which may comprise a plurality of storage tanks and in which the gas phases of these storage tanks are connected to one another by means of gas displacement lines. In two-tank systems, gas is shuttled between a hot tank and a cold tank. It is also known that nitrogen from liquid nitrogen tanks or air can be fed into such a gas displacement system while the exhaust air is routed into the surroundings.

The disadvantage of using molten salts is that they may solidify above room temperature. Most molten salts are even high-melting. For example, a sodium/potassium nitrate mixture melts, at the eutectic point, at a temperature of 218° C. in the case of a mixture ratio by weight of 44:56. In long pipeline systems, such as occur in solar power plants, molten salts with high melting points are difficult to manage reliably as heat transfer media. Freezing of the molten salt may give rise in pipeline systems to serious damage in economic terms. The cause of the damage may be its large molten volume, that is to say pronounced volume expansion during melting. This entails the risk that fittings and pipelines are pushed open and seriously damaged.

Freezing of molten salts may take place, in principle, outside the operating times of the solar power plant, that is to say outside the radiation times of the sun or when solar radiation is absent due to weather conditions. In this case, volume contraction occurs, which may lead to a different state of solidification as a function of the pipeline system and of the operating state. It is expected that the solidifying melt converges into units of greater or lesser size in low-lying regions of the pipeline system, whereas spaces not filled with salt are formed in upper regions of the system. During remelting, due to the possibly great distance in spatial terms between the melting points with volume expansion and the spaces not filled with salt, there may be insufficient volume compensation to reduce arising pressures, and this may lead to damage to the pipeline system as a result of volume expansion during melting.

At the present time, to prevent the freezing of the molten salt in the pipeline system during lengthy shutdown times, the pipeline system is emptied.

Moreover, freezing of the molten salt in the pipeline system also has to be prevented in the event of plant malfunctions, for example in the event of energy outage. In this case, too, emptying devices must function reliably, that is to say with high availability, as intended.

At the present time, downward emptying lines and a low-lying emptying tank are used to empty the pipeline network. The energy for emptying the pipeline network is usually taken from the potential energy of the liquid molten salt. However, emptying may also be additionally assisted by a propelling gas pressure. The propelling gas pressure may be applied, for example, at the highest point in the pipeline network.

Alternatively to a good emptying technology, it is also possible to employ salt mixtures which have a lower melting point than what is known as solar salt. This reduces the risk that the pipeline system freezes and is possibly damaged.

However, available salts and salt mixtures having a lower melting point have the disadvantage that their thermal stability is lower and that they may also contain components which are not readily available or are significant in toxicological terms. A reduction in the melting point is achieved, for example, by the addition of nitrite salts. However, these have the property that, at the high operating temperatures of heat transfer medium plants and in the presence of oxygen, nitrite ions may be oxidized into nitrate ions, the result of this being that the melting point of the heat transfer medium rises sharply. In order to avoid this, the ingress of oxygen is usually ruled out by the heat transfer medium circuit being closed off in a strictly sealing manner from the surrounding gas. However, closed-off systems likewise require entrances and exits, through which substances can be introduced into the system and discharged from the system respectively. These entrances and exits have to be checked, the check comprising, for example, the exclusion of oxygen or the separation of air-foreign substances, for example nitrogen dioxide.

Furthermore, in the case of nitrite and nitrate mixtures, there is the risk, in the boundary region of their thermal stability or upon contact with impurities, for example substances containing highly laden metal ions, or with organic substances, that nitrogen oxides are formed and, in open systems, are discharged into the surroundings. Both problems can be overcome by operating the heat transfer medium circuit such that it is closed from the surrounding gases. Such a closed heat transfer medium circuit can easily be implemented, for example, in a chemical plant, since all the components of the plant are set up closely adjacently to one another. However, this is not the case in pipeline networks of large solar power plants, which are very extensive and may generally reach overall pipe lengths of more than 100 km. In the event of emptying, vents have to be opened, possibly at a great distance from one another, at the highest points of the pipeline system. Since the venting points are at a long distance from one another, venting is usually carried out with ambient air. This, again, has the disadvantage, however, that oxygen, water or carbon dioxide are introduced into the system in an uncontrollable quantity by the ambient air and may react with components of the heat transfer medium liquid. For example, nitrite ions may react with oxygen to form nitrate ions. Carbon dioxide may form carbonates which may also occur as solids, and at high temperatures water may form hydroxides with nitrates and nitrites.

The object of the present invention is to provide a pipeline system for a solar power plant which, on the one hand, allows reliable operation of the power plant and in which, on the other hand, an inadmissible clinical variation of the heat transfer medium used is avoided.

This object is achieved by means of a pipeline system for a solar power plant, with at least one receiver line, in which a heat transfer medium is heated by radiating solar energy, or with a central receiver and with at least one emptying tank and/or one store for the heat transfer medium, the heat transfer medium having a vapor pressure of less than 0.5 bar at the maximum operating temperature, furthermore a gas displacement system being comprised, which connects gas spaces in the at least one emptying tank and/or in the store for the heat transfer medium to one another and has a central gas store or a central gas connection and a central exhaust gas outlet, through which gas can be discharged into the surroundings.

By means of the central gas store or the central gas connection, it is possible to operate the gas displacement system with a gas which can protect or cannot vary or can vary only in a controlled manner the heat transfer medium used. The situation is thereby avoided where the gas contained in the system inadmissibly damages the heat transfer medium. For example, in specific cases, the reaction of nitrite into nitrate has to be prevented by means of the oxygen contained in the gas space, that is to say the nitrate concentration is kept at a maximum value in order to prevent a rise of the melting point. On the other hand, by using an oxygen-containing gas, it is possible to keep the nitrite concentration in a predominantly nitrate-containing salt mixture at a specific value, since nitrite which may possibly arise can be converted into nitrate again by means of the oxygen contained in the gas. Too high a nitrite concentration leads to thermal salt instability, since nitrite ions are decomposed into oxide ions more easily and at lower temperatures than nitrate ions. By the addition of water, on the one hand, oxide ions formed as a result of thermal decomposition can be converted into hydroxide ions which are less corrosive. On the other hand, an excess of water decomposes nitrites and nitrates, with hydroxides being formed, and thereby increases the corrosiveness of the molten salt. Carbon dioxide can decompose nitrates and nitrites by the formation of carbonates.

According to the invention, the receiver lines are the pipelines on which receivers are arranged, The receivers are conventionally individual segments of the pipelines which are surrounded by a glass pipe. Underneath the glass pipes is located a mirror system in which radiating solar light is reflected and is steered onto the gas pipe. As a result of the incident radiation upon the glass pipe, heat is conducted to the heat transfer medium which flows through the pipeline, with the result that the heat transfer medium is heated.

Solar power plants in the context of the present invention are linearly concentrating solar power plants, for example Fresnel solar power plants or parabolic trough solar power plants, or tower power plants in which incident solar light is steered with the aid of mirrors on a central receiver which is usually arranged on a tower.

According to the invention, the gas displacement system comprises a pipeline network which is connected in each case to the gas spaces of the tanks used in the solar power plant. It is thereby possible, when the tanks are being filled or emptied via the gas displacement system, to implement pressure compensation by the supply of gas into a tank to be emptied or by the withdrawal of gas from a tank to be filled. Since, when the gas mass is constant and the pressure is the same, the volume increases with an increasing temperature, it is necessary to withdraw gas from the gas displacement system when gas transfer from a cold tank into a hot tank takes place by means of the gas displacement system, in order to compensate corresponding changes in volume by the decanting of heat transfer media. Correspondingly, in gas transfer from a hot tank into a cold tank, it is necessary to supply gas in order to keep the volume constant. Gas discharge in this case takes place via the central gas outlet and gas supply via the central gas connection or out of the central gas store. If a central gas store is used, it is especially advantageous if the central exhaust gas outlet is connected to the central gas store, so that the exhaust gas is captured in the central gas store. This is expedient particularly when a gas different from ambient air is employed, since the gas losses can thereby be minimized. In this case, the central gas store also serves at the same time as a volume compensating tank for the gas displacement system. The gas store may in this case be implemented either as a volume store with very slight overpressure or as a compressed gas store.

If a central exhaust gas outlet is provided, it is possible to provide only one exhaust gas outlet or to arrange a plurality of exhaust gas outlets either near to one another or so as to be distributed over the gas displacement system. It is likewise possible, instead of only one central gas connection, to provide a plurality of gas connections which may likewise lie near to one another or are distributed over the gas displacement system.

It is preferable if pipelines with a large cross section are used for the gas displacement system in order to implement very low flow resistance. For this purpose, the gas displacement system is usually designed only for a very low overpressure of a few millibar. Through a low overpressure being selected, large cross sections of the pipelines can be implemented. In this case, the pipelines may also be manufactured with comparatively small wall thicknesses.

In one embodiment of the invention, fresh gas is supplied via the central gas connection. By fresh gas being supplied, gas losses, which may occur, for example, due to gas being discharged into the surroundings, can be compensated. In the context of the present invention, fresh gas in this case means that gas can be supplied to the plant from an external stock, and for this purpose, for example, external gas stores may be provided. If the gas in the plant is ambient air, the fresh gas may also be sucked in as fresh air from the surroundings. If required, the fresh gas may also undergo purification operations which, for example, remove dust, aerosols, water vapor or carbon dioxide.

In an alternative embodiment, plant gas is introduced into the gas displacement system via the central gas connection. Plant gas is understood in this case to mean the gas which is contained in the plant and which may be withdrawn from the plant, for example, via the central exhaust gas outlet. If excess gas volume occurs in the plant, for example as a consequence of thermal expansion in the event of a temperature rise, it is necessary to capture the discharged gas and store it in a suitable gas tank. Alternatively, it is also possible to compress the plant gas and introduce it into a compressed gas store.

In order to empty the pipeline system in the event of a flow shutdown, it is necessary to introduce gas into the receiver lines. The gas may be withdrawn from the gas displacement system. If accelerated emptying is required, propellant gas with increased pressure may be introduced instead into the receiver lines. For this purpose, propellant gas may be used directly from a compressed gas system.

It is preferable, for emptying the pipeline system, to provide a gas pressure system. This comprises, for example, a pipeline network which is connected to the pipeline system via emptying valves. In addition, connections for emptying tanks, into which the heat transfer medium is discharged for emptying, may be provided. However, the emptying tanks may alternatively also be coupled to the gas displacement system, so that, during the emptying of the pipeline systems and the concomitant filling of the emptying tanks, the gas from the emptying tanks is introduced into the gas displacement system. By means of the gas pressure system, it is possible to provide propellant gas with a sufficiently high pressure for emptying the pipeline system.

During emptying, the heat transfer medium contained in the pipelines is propelled by the gas in the direction of the emptying tanks and can run out into the emptying tanks. This has the advantage, in particular, that freezing the pipelines can be avoided.

For example, particularly when a heat transfer medium is used which is not to come into contact with oxygen, for example when the heat transfer medium contains nitrite salts, it is necessary that the gas to be supplied via the central gas connection is provided in a gas store. If a stratified store is used for storing the heat transfer medium, the gas store may have considerably smaller dimensions than in a system with a hot store and a cold store for the heat transfer medium. In this case, as described, for example, in WO2011/138270, cold heat transfer medium can be withdrawn from the tank in liquid form and thermally induced volume fluctuations can thereby be compensated.

So that distances which are as short as possible can be implemented for the gas displacement system and possibly for the gas pressure system for the supply of compressed gas for emptying the pipelines, it is advantageous if both the pipelines for the gas displacement system and, if present, the pipelines for the compressed gas are arranged parallel to the main distributor and main header of the pipeline system. Furthermore, it is preferable for reasons of availability if the gas pressure system, for the supply of compressed gas, contains pressure accumulators in a decentral arrangement, especially preferably in the vicinity of the emptying tanks of the pipeline system and in the vicinity of the emptying valves. A large cross section for the lines of the pressure network is unnecessary, since the pressurized gas is required only rarely for emptying and therefore the filling of the decentral pressure accumulators is allowed to take a long time.

If a heat transfer medium tolerant to oxygen is used, it is possible to obtain the gas from the ambient air. Particularly when a pure molten nitrate salt is used as heat transfer medium, it is preferable to employ an oxygen-containing gas, since, in the event of conversion from nitrate into nitrite, the nitrite is converted into nitrate again by means of the oxygen present. An undesirable reduction in thermal stability can thereby be prevented. The oxygen-containing gas used may be, for example, air, oxygen-enriched air, oxygen or any inert gas enriched with oxygen. Alternatively to oxygen, it is also possible to supply nitrogen oxides to the gas displacement system. With the aid of the concentration ratio of nitrogen monoxide to nitrogen dioxide, influence can be exerted upon the ratio of the nitrite to nitrate concentration of the heat transfer medium. A high concentration of nitrogen monoxide promotes the formation of nitrite and a high concentration of nitrogen dioxide promotes the formation of nitrate.

If, however, a heat transfer medium which is not oxygen-tolerant is employed, for example a molten salt which also contains nitrite salt, it is preferable to supply the gas displacement system with a gas which is inert with respect to the heat transfer medium employed. In this case, for example, nitrogen or noble gases, preferably nitrogen, are suitable.

It is especially preferable to obtain the compressed gas from the plant gas which is contained in the gas displacement lines. The plant gas is preferably routed via a cooled separation system, possibly filtered and compressed by means of a compressor to the required pressure stage, preferably 10 to 20 bar abs.

If the solar power plant does not have a stratified store for the heat transfer medium, but instead a hot store and a cold store, the heat transfer medium is carried over during operation from the cold store into the hot store by means of the receiver lines, the heat transfer medium in the receiver lines being heated by the radiating solar energy. For energy recovery, the heat transfer medium is carried over from the hot store into the cold store and emits heat, for example for the generation of superheated steam which is used to drive turbines and generators for current generation. By the heat transfer medium being carried over from the hot store into the cold store of from the cold store into the hot store, volume is freed by the liquid in one of the two stores and occupied by the liquid in the other store in each case. The volume freed by the liquid has to be compensated by a supply of gas. For this purpose, the gas displacement system is used. At the same time, gas is displaced out of the store in which the heat transfer medium is introduced. The gas can then be carried over by means of the gas displacement system out of the store to be filled into the store to be emptied. In this case, however, account must be taken of the fact that the temperature of the gas is determined essentially by the temperature of its surroundings. Thus, the gas in the cold store has approximately the temperature of the heat transfer medium contained therein. The same also applies correspondingly to the gas in the hot tank. In the event of gas exchange from the hot tank into the cold tank, and vice versa, the gas assumes the temperature of its surroundings as a result of temperature compensation. The gas therefore has different temperatures as a function of the position in the gas displacement system. Depending on the level of its average temperature, the gas takes up a volume of different size, since the volume which the gas occupies, its mass being the same, is temperature-dependent. With a rising temperature, the volume also increases. This means that the gas occupies a large volume when the hot tank is empty and the cold tank full and a small volume when the cold tank is empty and the hot tank full. Furthermore, as a result of this, when a large volume is required, more gas is in the system, so that, for volume compensation, in each case gas has to be introduced into the system or has to be withdrawn from the system. The introduction or withdrawal of the gas into or out of the system takes place via the central gas connection or the central exhaust gas outlet. Particularly when inert gases are used, it is necessary here to store intermediately in a central gas store the gas withdrawn from the system via the exhaust gas outlet and to supply the gas from this intermediate store into the system again via the central gas connection when a large gas volume is required.

If the gas used is ambient air, it is possible, during the emptying of the hot tank, to emit the excess gas into the surroundings via the exhaust gas valve and correspondingly, during the emptying of the cold tank, to supply ambient air via the central gas connection.

Particularly when the gas is emitted into the surroundings, it is preferable if the central exhaust gas outlet has a device for gas purification. In the device for gas purification, environmentally harmful gases can be removed from the discharged plant gas. Moreover, it is also possible by means of the device for gas purification, for example, to remove solids or liquids contained in the gas. In this way, it is possible, for example, to separate out of the gas liquid drops entrained by the gas, for example heat transfer medium or else heat transfer medium solidified due to cooling, before this gas is emitted into the surroundings. It is also possible, for example, to remove liquids or solids from the gas before the latter is supplied to a central gas store, in order to avoid contamination of the central gas store.

Particularly when nitrate salts and/or nitrite salts are employed as heat transfer medium, it is preferable, furthermore, if the apparatus for gas purification removes nitrogen oxides from the gas. The nitrogen oxides may arise, for example, as result of the reaction of the nitrite or of the nitrate with oxygen. Since the aim, for environmental protection reasons, is to emit as few nitrogen oxides as possible or no nitrogen oxides into the surroundings, it is necessary to remove these from the gas. The removal of the nitrogen oxides may in this case take place by means of a conventional denox plant known to a person skilled in the art.

Since, in a linearly concentrating solar power plant, for example a parabolic trough solar power plant or a Fresnel solar power plant, the pipeline systems in which the receivers are accommodated are arranged in the form of a plurality of solar arrays which are connected in each case via central headers and distributors, by means of which the heat transfer medium is supplied and discharged, it is advantageous, furthermore, to lay the pipelines of the gas displacement system such that they run parallel to the headers and distributors for the heat transfer medium to the receiver lines. In this way, the pipelines for the gas displacement system can be made as short as possible. Moreover, it is possible to connect the pipelines of the gas displacement system to the headers and distributors in each case at the required locations, without complicated pipework having to be provided.

If the solar power plant comprises a plurality of receiver lines, these are usually connected to a header and a distributor. Via the distributor, the heat transfer medium is fed from a cold storage region into the receiver lines, flows through the receiver lines, in which the heat transfer medium is heated, and flows into the header, via which the heat transfer medium is routed into a hot storage region. In this case, the hot storage region and the cold storage region may be implemented in each case by structurally separate tanks or, alternatively, as storage regions in a stratified store, the cold storage region usually being located at the bottom in the stratified store and the hot storage region at the top.

Depending on the geography of the area where the solar power plant occurs, headers and distributors may be arranged in structural proximity to one another or be spaced apart from one another. If headers and distributors are arranged in structural proximity to one another, the receiver lines are usually pipeline loops. A sufficiently long length of the receiver lines can thereby be implemented, which is necessary in order to heat the heat transfer medium flowing through the receiver lines. If headers and distributors are spaced apart from one another, the receiver lines can also connect the headers and distributors linearly. In this case, headers, distributors and receiver lines are in the form of a ladder, the receiver lines forming the rungs.

Exemplary embodiments of the invention are illustrated in the figures and are explained in more detail in the following description.

Figure 2:
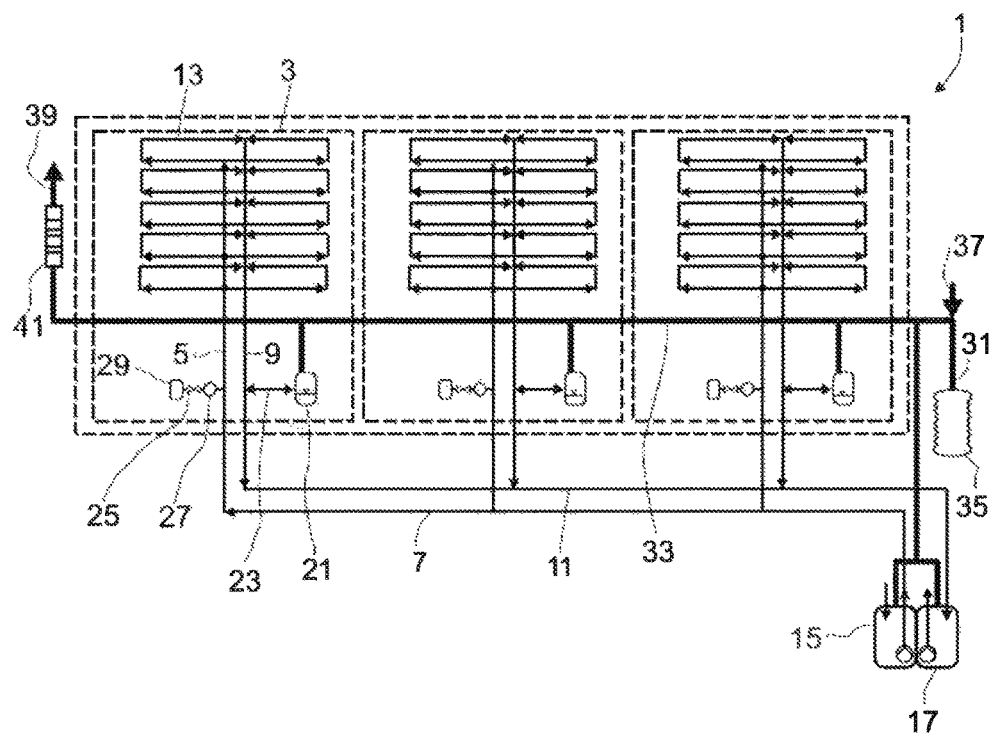
Figure 3:
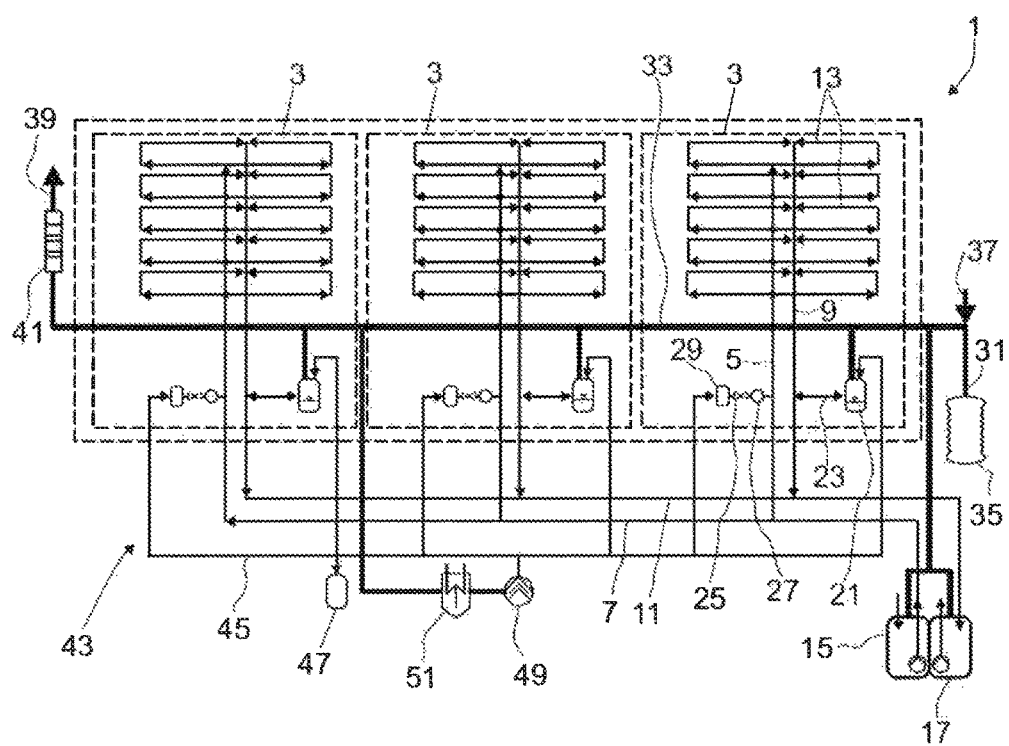
Figure 4:
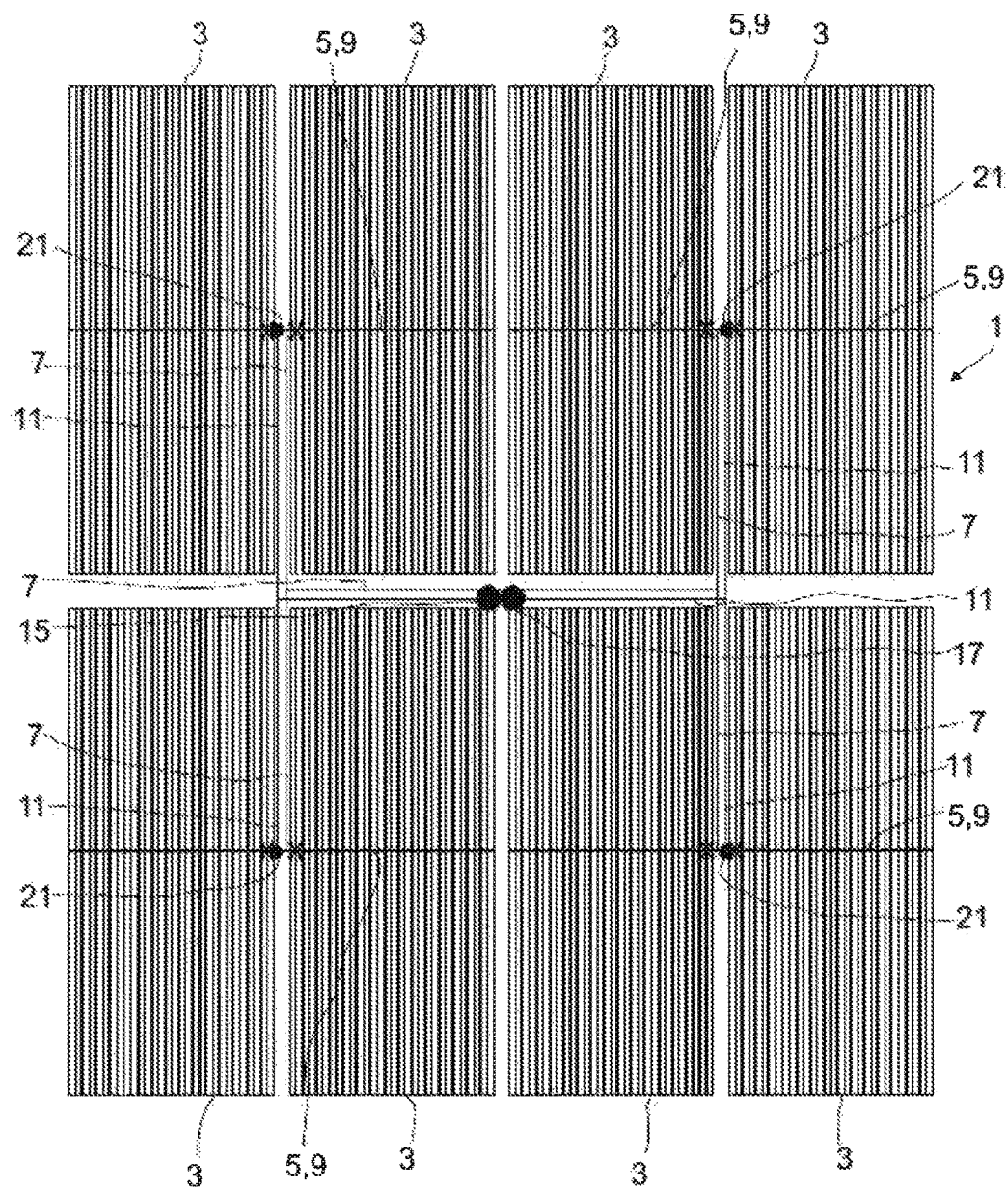

In the figures:

FIG. 1 shows a diagrammatic illustration of a linearly concentrating solar power plant, FIG. 2 shows a diagrammatic illustration of a linearly concentrating solar power plant with an outwardly closed-off gas displacement system, FIG. 3 shows a linearly concentrating solar power plant with an outwardly closed-off gas displacement system and with a gas pressure system for filling and emptying a solar array, FIG. 4 shows a linearly concentrating solar power plant in a double-H structure.

A linearly concentrating solar power plant is illustrated diagrammatically in FIG. 1.

A linearly concentrating solar power plant 1 comprises a plurality of segments 3 which are connected in each case via a distributor 5 to a central distributor 7 and via a header 9 to a central header 11. In each case receiver lines 13 are fed with a heat transfer medium via the distributors 5 and headers 9. For this purpose, the heat transfer medium is conducted via the central distributor 7 into the distributors 5 and flows out of the distributors 5 into the receiver lines 13. The receiver lines 13 are in each case receivers, not illustrated here, in which the heat transfer medium is heated by solar radiation. The heated heat transfer medium flows out of the receiver lines 13 into the headers 9 and from these into the central header 11. In the embodiment illustrated here, the receiver lines 13 are configured as pipeline loops.

The central distributor 7 is connected to a cold store 15, from which the heat transfer medium is withdrawn as long as sunlight falls onto the receivers. The heated heat transfer medium is then introduced through the central header 11 into a hot store 17.

The receivers are usually individual segments of the pipelines which are surrounded by a glass pipe. Located beneath the glass pipes is a mirror system in which radiating sunlight is reflected and steered onto the glass pipe. By the radiation falling onto the glass pipe, heat is conducted to the heat transfer medium which flows through the pipeline, with the result that the heat transfer medium is heated, In a parabolic trough solar power plant, in this case the mirrors are arranged, for example in the form of a trough, underneath the glass pipe. In a Fresnel solar power plant, adjustable mirrors, which can be moved as a function of the angle of the incident solar energy, are located underneath the pipelines.

In order to recover energy, the hot heat transfer medium is withdrawn from the hot store 17 with the aid of a pump 19 and is conducted into a heat exchanger, not illustrated here. In the heat exchanger, the heat transfer medium gives off heat to a steam circuit in which steam is generated and superheated. By means of the superheated steam, for example, turbines for driving generators for current generation can then be operated. The cooled heat transfer medium leaving the heat exchanger is recirculated into the cold store 15. Conventionally, the quantity of stored heat transfer medium is such that the quantity of hot heat transfer medium is sufficient still to operate the turbine even when the sun is not shining or there is insufficient solar radiation to heat large quantities of heat transfer medium.

So that the pipelines of the linearly concentrating solar power plant 1 can be emptied at shutdown times, each segment 3 has an emptying tank 21. The emptying tank 21 is in this case connected to the header 9 of a segment 3 via an emptying line 23. Connected to the distributor 5 of each segment 3 is a venting valve 25 which is opened in order to empty the pipelines of the segment 3. For this purpose, compressed gas is introduced into the distributor 5 by means of the venting valve 25, and the gas flows through the distributor 5 and the receiver lines 13 into the header 9 and thereby presses the heat transfer medium out of the header 9, receiver lines 13 and distributor 5 through the emptying line 23 into the emptying tank 21.

In order to fill the individual segments 3 with heat transfer medium again for renewed operation, the heat transfer medium is conducted out of the emptying tank 21 through the emptying line 23 into the header 9 and from there through the receiver lines 13 back into the distributor 5. In this case, the gas escapes from the pipelines through the venting valve 25 into the gas displacement system 33. The line required for this purpose is not illustrated. In order to avoid discharging any heat transfer medium into the gas displacement system 33, a phase detector 27 is arranged between the venting valve 25 and the distributor 5. The change between the gas phase and the liquid phase is detected in the phase detector 27. The detected change shows that the gas phase has largely been pressed out of the receiver lines 13 and the receiver lines 13 are correspondingly filled with liquid. The filling of the receiver lines 13 is terminated by this event.

The propellant gas for emptying the pipelines is withdrawn, for example, by decentral compressed gas stores 29. In this case, each segment 3 is assigned a decentral pressure accumulator 29, the decentral pressure accumulator 29 being connected to the distributor 5 and the receiver lines 13 via the venting valve 25.

A linearly concentrating solar power plant with an outwardly closed-off gas displacement system is illustrated in FIG. 2.

The set-up of the linearly concentrating solar power plant 1 illustrated in FIG. 2 corresponds essentially to that illustrated in FIG. 1. In contrast to the linearly concentrating solar power plant 1 illustrated in FIG. 1, the linearly concentrating solar power plant 1 illustrated in FIG. 2 additionally comprises a gas displacement system 31. The gas displacement system 31 comprises a gas displacement pipeline network 33 which is connected to a gas volume store 35, to the cold store 15, to the hot store 17 and to all the emptying tanks 21. In this case, the gas connections are located in each case at the head of the cold store 15, of the hot store 17 and of the emptying tanks 21, so that the gas displacement pipeline network 33 is connected in each case to the gas spaces of the respective tanks 15, 17, 21. A stratified store could also be incorporated in a similar way instead of the cold and the hot store 15, 17.

In addition, the gas displacement pipeline network 33 has a central gas connection 37 and an exhaust gas outlet 39. Additional gas can be supplied, as required, via the central gas connection 37 and excess gas can be discharged via the exhaust gas outlet 39. For the conditioning of the exhaust gas, exhaust gas purification 41 is preferably provided at the exhaust gas outlet 39. The exhaust gas purification is, for example, a denox system for the breakdown of nitrogen oxides from the gas to be discharged.

By means of the gas displacement system, it is possible to compensate pressure changes in the case of different filling heights in the individual storage tanks 15, 17, 21. Thus, for example, during the heating of the heat transfer medium, gas can pass out of the hot store 17 into the cold store 15. Excess gas can then be captured in the gas volume store 35 and can pass from there back into the gas displacement system 31 again when a larger gas mass is required in order to fill the corresponding gas volume.

FIG. 3 shows a diagrammatic illustration of a linearly concentrating solar power plant with an outwardly closed-off gas displacement system and with a gas pressure system for filling and emptying the solar array.

In the linearly concentrating solar power plant 1 illustrated in FIG. 3, a gas pressure system 43 is additionally arranged. The gas pressure system 43 comprises a compressed gas pipeline system 45, to which the decentral compressed gas stores 29 and the emptying tanks 21 are connected. The decentral pressure accumulators 29 can be filled via the compressed gas pipeline system 45. In addition, the gas pressure system 43 may comprise a central compressed gas store 47. The central compressed gas store 47 may be used, in particular, for keeping additional compressed gas in stock. The use of the central compressed gas store 47 is optional. Alternatively or additionally to the central compressed gas store 47, the gas pressure system 43 is connected to the gas displacement pipeline network 33 of the gas displacement system 31 via a compressor 49. It is thereby possible to feed gas from the gas displacement system 31 into the gas pressure system 43 via the compressor 49. In order to remove foreign substances possibly contained in the gas of the gas pressure displacement system 31, it is advantageous for the compressor 49 to be preceded by a separation device 51.

In order to empty the pipelines of the linearly concentrating solar power plant 1 which carry heat transfer medium, compressed gas from the decentral pressure accumulators 29 is fed into the distributors 5 via the venting valves 25 and a phase separator having the phase detector 27. The compressed gas displaces the heat transfer medium out of the distributors 5, receiver lines 13 and headers 9 into the emptying tanks 21. As a result, the emptying tanks 21 are filled with the heat transfer medium and the gas contained in the emptying tanks 21 is pressed out of the emptying tanks into the gas displacement system 33.

In order to put the linearly concentrating solar power plant 1 into operation again, compressed gas is pressed into the emptying tanks 21 via the compressed gas pipeline system 45 and the heat transfer medium is thereby recirculated through the emptying lines 23 first into the header 9 and via the header into the receiver lines 13 and the distributor 5. The pipelines carrying heat transfer medium are thereby filled with the heat transfer medium again, so that the linearly concentrating solar power plant 1 can operate again. After the emptying of the system, the decentral compressed gas stores 29 are filled with compressed gas again. For this purpose, for example, plant gas is introduced from the gas displacement system 33 via the compressor 49 into the gas pressure system 43 or, alternatively, into the central compressed gas store 47.

FIG. 4 shows a possible arrangement of segments 3 of a linearly concentrating solar power plant 1, this arrangement making it possible to have a minimal pipeline length. The arrangement is in this case in a double-H structure.

In order to ensure a minimal pipeline length, it is advantageous to arrange the hot store 17 and the cold store 15 centrally in the linearly concentrating solar power plant. The central distributor 7 and the central header 11 run in the form of an H from the cold store 15 and the hot store 17.

The cold store 15 and the hot store 17 are in this case located in the middle of the H. At the respective ends of the legs of the H, in each case the distributors 5 and headers 9 of the individual segments 3 runs off from the central distributor 7 and central header 11. Thus, two segments 3 are arranged at each end of a leg of the H, this again resulting in each case in the structure of an H.

In order also to keep the pipeline lengths for the gas displacement pipeline network and the compressed gas pipeline system as short as possible, it is advantageous if the pipelines of the gas displacement system and of the gas pressure system run parallel to the central distributor 7 and central header 11.

If a larger number of segments is desired, it is possible in each case to lengthen the central distributors 7 and central headers 11 in order to be able to connect additional segments 3 to the central distributor 7 and central header 11, so that, even in this case, one cold store 15 and one hot store 17 are sufficient for the entire linearly concentrating solar power plant 1. Should the heat transfer medium quantity be so large that a plurality of cold stores 15 and of hot stores 17 become necessary, in each case individual linearly concentrating solar power plants 1 can be operated independently of one another. Alternatively, it is also possible that the gas displacement system, the compressed gas system and the systems carrying heat transfer medium are operated in a coupled manner.

The invention claimed is:

1. A pipeline system for a solar power plant (1), wherein the pipeline system comprises at least one receiver line (13), in which a heat transfer medium is heated by radiating solar energy, or a central receiver, and at least one emptying tank (21) and/or a store for the heat transfer medium, the heat transfer medium having a vapor pressure of less than 0.5 bar at the maximum operating temperature, wherein, the pipeline system furthermore comprises a gas displacement system (31), which connects gas spaces of containers used in the solar power plant to one another and which has a central gas store (35) and/or a central gas connection (37) and a central exhaust gas outlet (39), through which gas can be discharged into the surroundings.

2. The pipeline system according to claim 1, wherein the central gas connection (37) is assigned a pump, by means of which the pressure of the gas can be increased.

3. The pipeline system according to claim 1, wherein the store for the heat transfer medium is a stratified store.

4. The pipeline system according to claim 1, wherein the gas displacement system (31) is connected to a gas pressure system (43) which is connected to emptying valves of the receiver lines (13).

5. The pipeline system according to claim 1, wherein the central exhaust gas outlet (39) has a device for gas purification (41).

6. The pipeline system according to claim 5, wherein the device for gas purification (41) removes solids and/or nitrogen oxides from the gas.

7. The pipeline system according to claim 1, wherein pipelines of the gas displacement system (31) run parallel to headers (9, 11) and distributors (5, 7) for the heat transfer medium to the pipeline loops (13).

8. The pipeline system according to claim 1, wherein the receiver lines (13) are pipeline loops with receivers.

9. The pipeline system according to claim 1, wherein headers and distributors are spaced apart from one another and the receiver lines run linearly between header and distributor.

10. The pipeline system according to claim 1, wherein the containers used in the solar power plant comprise the at least one emptying tank (21) and the store for the heat transfer medium.

11. A solar power plant comprising the pipeline system according to claim 1, wherein the solar power plant is a linearly concentrating solar power plant or a tower power plant.

12. A process for operating a solar power plant having a pipeline system according to claim 1, wherein by the gas displacement system a pressure compensation is realized by supply of gas into a tank to be emptied or by removal of gas from a tank to be filled.

13. The process according to claim 12, wherein gas is removed from the gas displacement system when there is a gas transfer from cold into a hot tank and gas is introduced into the gas displacement system when there is a gas transfer from a hot into a cold tank.

14. The process according to claim 12, wherein fresh gas is supplied via the central gas connection (37).

15. The process according to claim 12, wherein plant gas is introduced into the gas displacement system (31) via the central gas connection (37).

16. The process according to claim 12, wherein the gas supplied to the gas displacement system (31) is inert with respect to the heat transfer medium.

17. The process according to claim 12, wherein the gas supplied to the gas displacement system (31) is nitrogen.

18. The process according to claim 12, wherein the gas supplied to the gas displacement system (31) contains water and/or carbon dioxide.

19. The process according to claim 12, wherein the gas supplied to the gas displacement system (31) contains oxygen.

20. The process according to claim 12, wherein the gas supplied to the gas displacement system (31) contains nitrogen oxides.

\* \* \* \* \*